Feb. 21, 1950     B. REIL     2,498,609
AUTOMATIC ELECTRIC WIRE ROLLER
FOR ELECTRIC POWER LAWN MOWERS
Filed Jan. 12, 1948     2 Sheets-Sheet 2
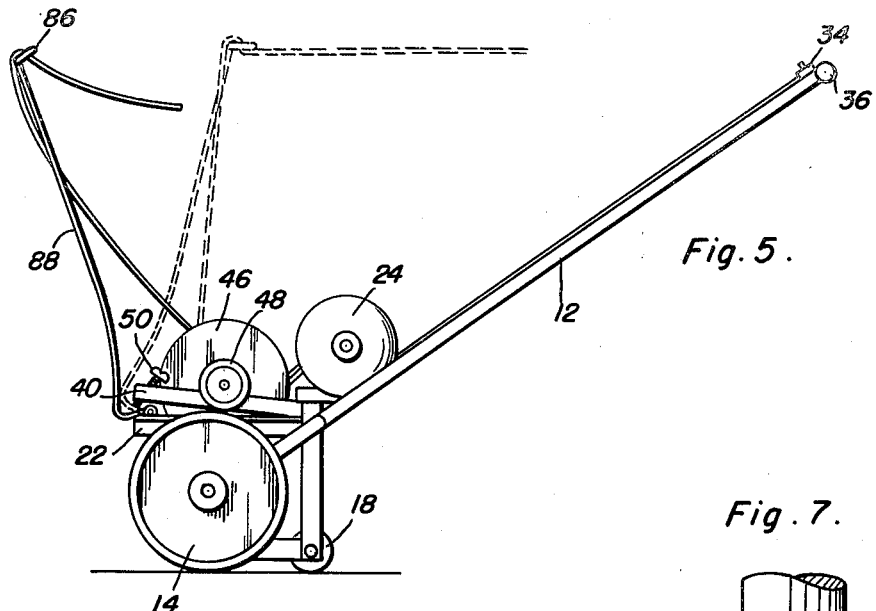
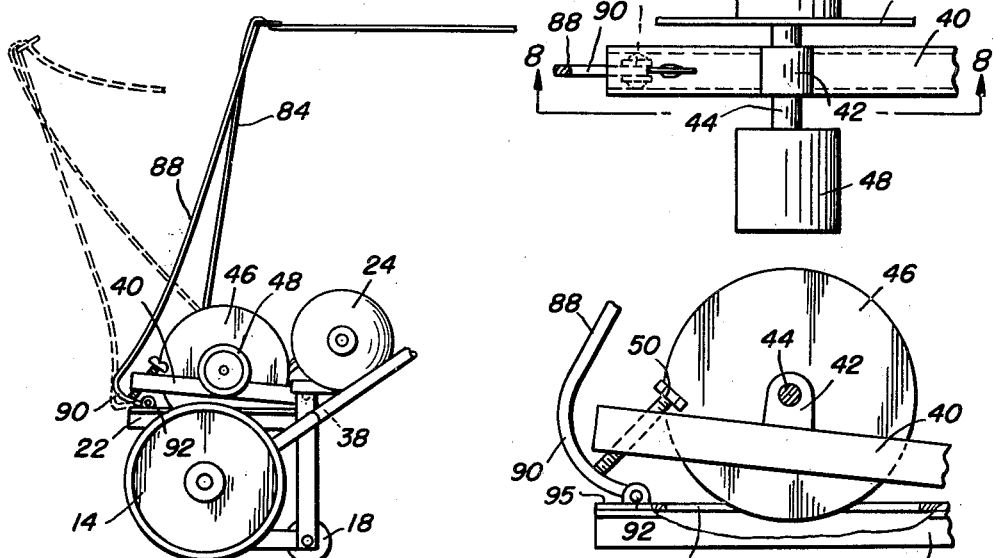
Ben Reil
*INVENTOR.*

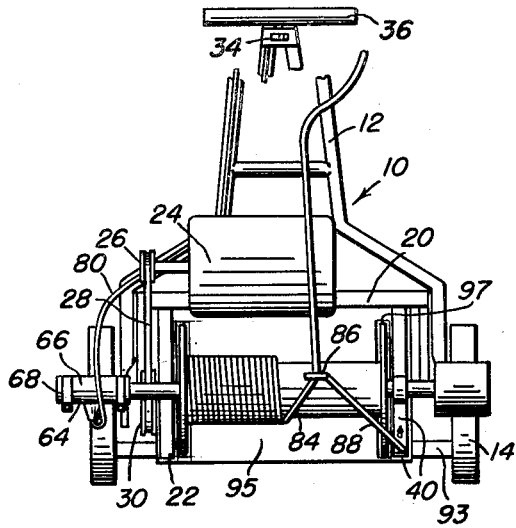

Patented Feb. 21, 1950

2,498,609

UNITED STATES PATENT OFFICE 2,498,609

AUTOMATIC ELECTRIC WIRE ROLLER FOR ELECTRIC POWER LAWN MOWERS

Ben Reil, Dunkerton, Iowa

Application January 12, 1948, Serial No. 1,706

10 Claims. (Cl. 191—12.2)

This invention comprises novel and useful improvements in an automatic electric wire roller for electric power lawn mowers and more specifically pertains to an automatically operated power reel for conveniently storing the slack in an electric cable supplying current from a fixed source to an electric motor operated lawn motor.

The principal object of this invention resides in providing an electric motor operated lawn mower which may be conveniently operated by an electric cable from a remote power source.

A further object of the invention is to provide a mower of the character set forth in the preceding object, wherein satisfactory means is provided for efficiently preventing the accumulation of undesirable slack in the electric cable powering the motor.

An important feature of the invention resides in the provision of an automatic reel for winding in slack in an electric cable powering the motor of an electric mower, together with an improved mechanism operable in response to slack in the electric cable for applying power means to the reel for winding up the slack of the cable; and which is efficiently operable to disconnect the power means upon the attainment of a predetermined tension in the electric cable.

A still further feature of the invention resides in the provision of a mechanism for continuously maintaining a constant electric circuit between the electric cable, and the electric motor, despite the intermittent operation of the automatic reel for storing the cable.

And a final important feature of the invention resides in the provision of a tension operated means for connecting and disconnecting the power driving means of the reel, together with means for conveniently adjusting the clearances between the tensioning mechanism and the power operating mechanism of the reel.

These, together with various ancillary objects of the invention which will later become apparent as the following description proceeds, are attained by this device, a preferred embodiment of which has been illustrated by way of example only in the accompanying drawings, wherein—

Figure 1 is a top plan view, parts being broken away, showing the invention applied to a lawn mower;

Figure 2 is a front elevational view of the arrangement of Figure 1;

Figure 3 is a fragmentary horizontal sectional view showing the electric connecting means between the cable carried by the reel and the electric conductor going to the motor of the mower;

Figure 4 is an enlarged detailed view of the electric connection shown in Figure 3;

Figure 5 is a side elevational view of the invention shown in the preceding figures, the parts being indicated in position whereby the reel is operated for winding in slack in the electric cable;

Figure 6 is a view similar to Figure 5 but showing the electric cable under tension and the reel disconnected from its driving mechanism;

Figure 7 is a fragmentary top plan view of a portion of the reel, its driving mechanism and its supporting arm; and, Figure 8 is a vertical transverse sectional view taken substantially upon the plane of the section line 8—8 of Figure 7 and showing more clearly the adjusting means for the tension operated power actuating means of the reel.

Referring now more specifically to the accompanying drawings, wherein like numerals designate similar parts throughout the various views, attention is directed first to Figures 1 and 2, wherein 10 indicates generally any suitable type of lawn mower to which the present invention may be applied, which consists of the customary handle 12 for guiding and manipulating the lawn mower, the mower wheels 14, which drive the customary grass cutting reel 16 journaled between said wheels and operated thereby.

As shown best in Figures 5 and 6, in accordance with conventional practice, the mower is provided with a rear supporting roller 18, for adjusting the height of the cutter bar, not shown of the mower, in accordance with conventional practice.

The mower is provided with a suitable supporting frame, consisting of a transverse rear bar 20 from whose ends are provided forwardly extending frame arms 22, mounted in any suitable manner upon the mower. An electric motor 24 for powering the lawn mower is detachably mounted in any suitable fashion upon the frame, and is provided with a driving pulley 26 connected as by a belt 28 with a driven pulley 30 carried by the axle 32 of the cutting reel 16. The customary control switch 34 is provided preferably adjacent the handle cross bars 36 of the handle 12 of the mower, which switch controls the operation of the motor 24 for effecting operation of the cutter reel, and hence operation of the driving wheels 14 of the mower.

Pivoted to the frame of the mower, at one side thereof is a forwardly extending pivotal arm 40 pivoted to the frame at 38, see Fig. 6, which intermediate its ends is provided with an upstanding support 42 in which is journaled an axle 44 of a reel or spool 46. The end of the axle 44 is provided with a pulley 48 which is disposed to overlie and have a frictional driving engagement with one of the driving wheels 14, upon pivotal movement of the supporting arm 40.

The forward end of the arm 40 is provided with a downwardly extending adjusting bolt 50 for a purpose to be later set forth. The construction of the arm, the support, the axle and the pulley together with the adjusting bolt is more clearly set forth in Figures 7 and 8.

As shown best in Figure 3, the other end of the reel from the pulley 48, is provided with a tubular axle as indicated at 52, which is journaled within a bearing bushing or sleeve 54 carried by the arm 40. Rigidly secured to the end of the axle 52, is an electrically conducting shaft 56, which at its outer extremity is provided with an annular electrically conducting bushing 58. Spaced inwardly of the bushing 58, is a similar annular conducting bushing or sleeve 60, which is rigidly secured to the shaft 56 but is insulated therefrom as by an insulating sleeve or lining 62. Removably but rigidly carried by any suitable portion of the frame of the lawn mower, is a brush holder consisting of a lower section 64 and a removable upper section 66 detachably connected to each other as by straps, bands, split rings or the like 68. The electrical conducting member 56, and the rings 58 and 60 thereon, extend within the generally cylindrical brush holder 66 and are rotated therein in response to rotation of the spool or reel as set forth hereinafter.

Slidable in bores in the brush holder base member 64, are a pair of electrically conductive brushes 70 and 72 respectively engaging the rings 58 and 60, and being yieldingly urged thereagainst as by the spring 74 adjusted by the adjusting screw 76. Suitable detachable electrical terminals 78 are imbedded in the base portion of the brush holder, and are constantly in relative sliding contact with the brushes 70 and 72, to thereby establish a readily detachable electrical connection with the motor 24 and switch 34 as by means of cables 80 and 82.

An electric cable 84 connected to any suitable fixed source of electric current not shown, has its delivery end connected as at 86 and 88 respectively with the electrically conducted shaft 56 and the conducting ring 60. As will be noted by reference to Figure 4, the shaft 56 is in direct electrical conductive relation with the ring 58, whereby the two rings 58 and 60 are directly connected at all times with the cable 84, and by means of the above mentioned conductors 80 and 82, with the electric motor 24 and the control switch thereof 34.

As will be seen best by reference to Figures 5, 6 and 8, the electric cable 84 extends through an eyelet 86 carried by the upper end of a mast 88, whose lower end is inwardly curved as at 90 and is pivoted as at 92 to a portion of the frame member 20, in position to underlie one of the arms 40 and to abut the end of the adjusting screw 50 thereof. The mast 88 constitutes a tension operated means for controlling the operation of the reel 46.

The arrangement is such that the mast 88 normally extends forwardly into the full line position shown in Figure 5, the mast being urged to this position by the weight of the reel 46 imparted thereto by the supporting arm 40 and the adjusting screw 50 bearing against the curved portion 90 of the mast as well as by its own weight.

The operation of the mast in the automatic tension controlled actuation of the reel is as follows:

When there is any slack in the cable 84, such for example as indicated in the full line showing of Figure 5, the mast 88 is in its forward position, being urged thereto by the weight of the reel 46 which is now in its lowermost position, and its own weight whereby the driving pulley 48 thereof rests upon and is in frictional driving engagement with the wheel 14 of the mower. As will be seen, as the mower moves forward and the wheel 14 is rotated, the latter will also operate the pulley 48 and thus rotate the reel 46 to wind in or reel in any slack in the cable 84. When this slack is taken up, and a predetermined tension is imparted to the cable 84, the drag of this tension applied to the eyelet 86, will urge the mast into its rearward position as shown in full lines in Figure 6, and in dotted lines in Figure 5, and the resultant pivotal movement of the curved portion 90 about its pivot pin 92, will cause the curved portion of the mast to engage the end of the adjusting screw 50, and elevate the support arm 40 into inoperative position.

It will thus be seen that the weight of the mast 88 and the reel 46 will be sufficient to urge the same into position to establish a driving engagement between the pulley 48 thereof and one of the wheels 14 of the mower. If desired, this weight may be supplemented by the imposition of a spring to yieldingly urge the reel and pulley into their driving relation.

The adjusting screw 50 is provided to give the desired operating clearance between the mast 88 and the supporting arm 40 for regulating the extent of actuation of the supporting arm in response to the attainment of a predetermined tension in the cable 84. As will readily be understood, the frictional engagement imparted by the cable 84 extending through the eyelet 86 and then downwardly to the reel 46, will be sufficient to cause the pivotal movement of the mast 88 in response to the attainment of a predetermined tension in the cable.

The inner end of the cable 84, preferably extends through the drum of the reel, to an aperture not shown into the interior thereof, and this is conducted through the tubular axle 52, and is connected to the conductor rings 58 and 60 as above set forth.

Indicated at 95 in Figures 1, 2 and 8 is a horizontally disposed shield secured in any desired manner to the frame of the motor upon the members 22, above the reel 16. This shield acts as a guard preventing the throwing of grass or other matter upwardly by the revolving reel 16. Slots 97 are cut with the shield, see Figure 8, to receive the end flanges of reel 46 as the end thereof is lowered, as in Figure 8.

From the foregoing it will be seen that there has been provided a device for attaining the objects of this invention, and since numerous modifications will readily occur to those skilled in the art after a consideration of the foregoing specification and annexed drawings, it is not intended to limit the invention to the exact construction shown and described, but all suitable modifications and equivalents may be resorted to falling within the scope of the appended claims.

Having described the invention, what is claimed as new is:

1. In combination, a lawn mower with wheels having an electric motor for operating said wheels, an electric cord for powering the motor from a stationary electric supply, a reel carried by said mower for storing said cord, a driving connection for operating said reel directly connectable with a driving wheel of said mower and means actuated by the tension in said cord for controlling said driving connection, said reel being journaled between a pair of forwardly extending arms, said arms being pivoted to the frame of said mower, a mast pivoted to said frame, a cord receiving eye at the top of said mast, a portion of said mast engaging one of said arms for pivotal movement thereof.

2. The combination of claim 1 wherein said mast is pivoted to said frame on the same side of the mower as said driving connection.

3. The combination of claim 2 including an adjusting means for regulating the clearances between said mast and arm.

4. In a lawn mower having a frame, supporting and driving wheels carried by said frame, a cutting reel journaled transversely of said frame between and operatively connected to said wheels, an electric motor on said frame drivingly connected with said wheels, a conduit reel journaled on said frame above and substantially parallel to said cutting reel, an electric conduit for powering said motor from a stationary electrical supply and adapted to be stored upon said conduit reel, a driven pulley carried by said reel, actuating means responsive to a predetermined tension in said conduit for moving said pulley along an arcuate path for selectively establishing and interrupting a driving connection between said pulley and one of said driving wheels, a mast swingably mounted on said frame, a frictional grip on said mast engageable with said conduit for causing swinging of said mast in response to predetermined tension in said conduit, an operating connection between said mast and said actuating means for operating the latter in response to swinging movement of said mast.

5. The combination of claim 4, wherein said actuating means includes an arm pivoted to said frame, said reel at its end adjacent said pulley being journaled on said arm.

6. The combination of claim 5, wherein said operating connection engages said mast and said arm.

7. The combination of claim 6, wherein said operating connection further includes a bolt carried by said arm and abutting said mast.

8. In a lawn mower having a frame, supporting and driving wheels carried by said frame, a cutting reel journaled transversely of said frame between and operatively connected to said wheels, an electric motor on said frame drivingly connected with said wheels, a conduit reel journaled on said frame above and substantially parallel to said cutting reel, an electric conduit for powering said motor from a stationary electrical supply and adapted to be stored upon said conduit reel, a driven pulley carried by said reel, actuating means responsive to a predetermined tension in said conduit for moving said pulley along an arcuate path for selectively establishing and interrupting a driving connection between said pulley and one of said driving wheels, an upstanding mast hinged to said frame in advance of said conduit reel, said conduit being frictionally engaged with the upper end of said mast for swinging movement of the same in response to predetermined variations of tension in said conduit, an operating connection between said mast and said actuating means.

9. The combination of claim 8, wherein said operating connection includes a member for adjusting the clearance between said mast and actuating means.

10. A lawn mower having an electric motor for operating the same, an electric cord for powering the motor from a stationary electric supply, a reel carried on said mower for storing slack in said cord, a driven means on said mower, a driving connection for operating said reel from said driven means, and means actuated by the tension in said cord for controlling said driving connections to wind the slack in the cord upon the reel and for releasing the reel to the tension upon the cord, a mast pivoted to said mower, a cord receiving eye on said mast whereby tension of the cord will effect pivotal movement of said mast, and means connecting with said mast for operating said driving connection in response to said pivotal movement.

BEN REIL.

REFERENCES CITED

The following references are of record in the file of this patent:

UNITED STATES PATENTS

| Number | Name | Date |
|---|---|---|
| 1,247,444 | Norris | Nov. 20, 1917 |
| 1,297,146 | Gleason | Mar. 11, 1919 |
| 1,567,055 | Huff | Dec. 29, 1925 |
| 1,921,288 | Farmer et al. | Aug. 8, 1933 |

FOREIGN PATENTS

| Number | Country | Date |
|---|---|---|
| 2,045 | Australia | May 27, 1926 |